Dec. 1, 1925.
R. MacEACHEN
1,563,387
COAL ELEVATING AND CONVEYING APPARATUS
Filed Aug. 7, 1923    6 Sheets-Sheet 1
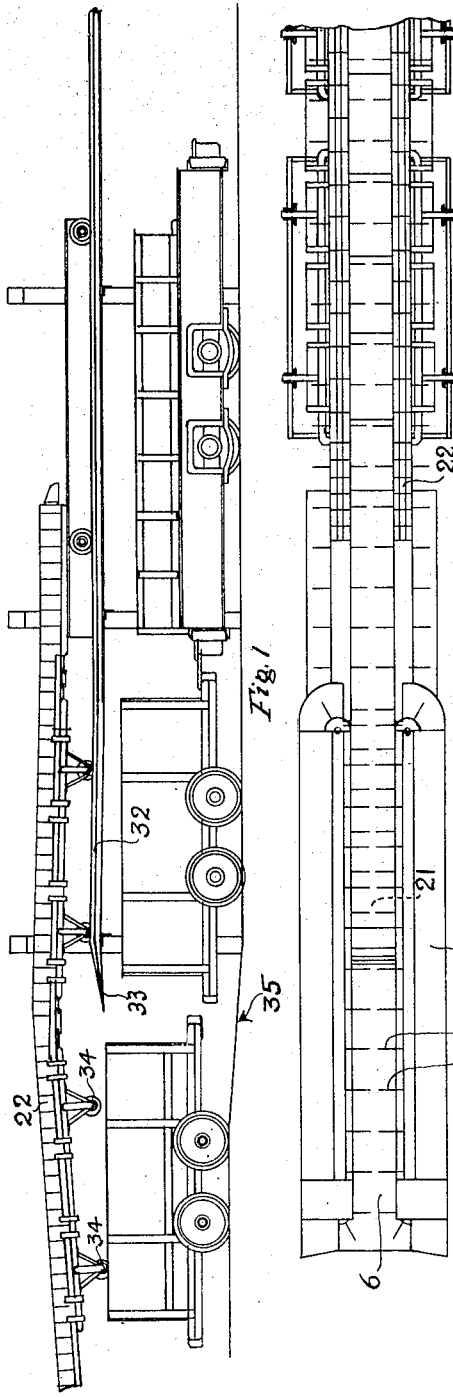
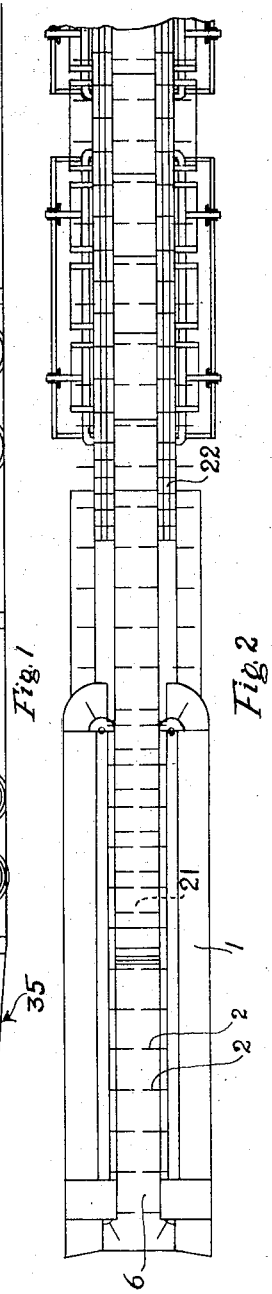
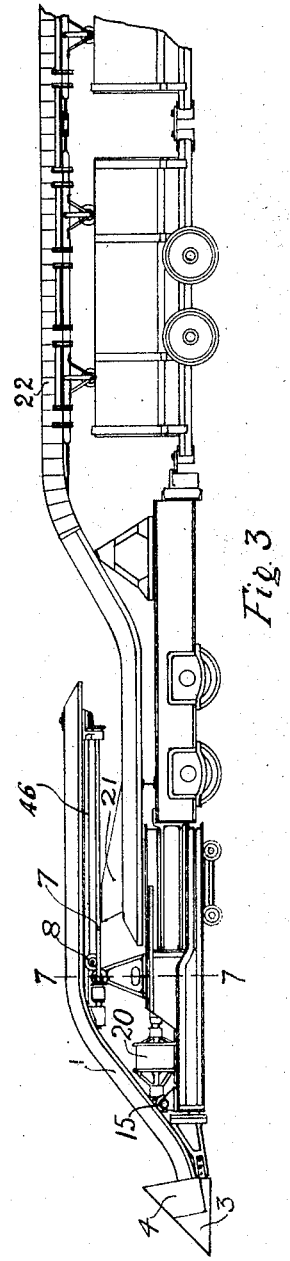
Roderick MacEachen,
Inventor
by Lester L. Sargent
Attorney

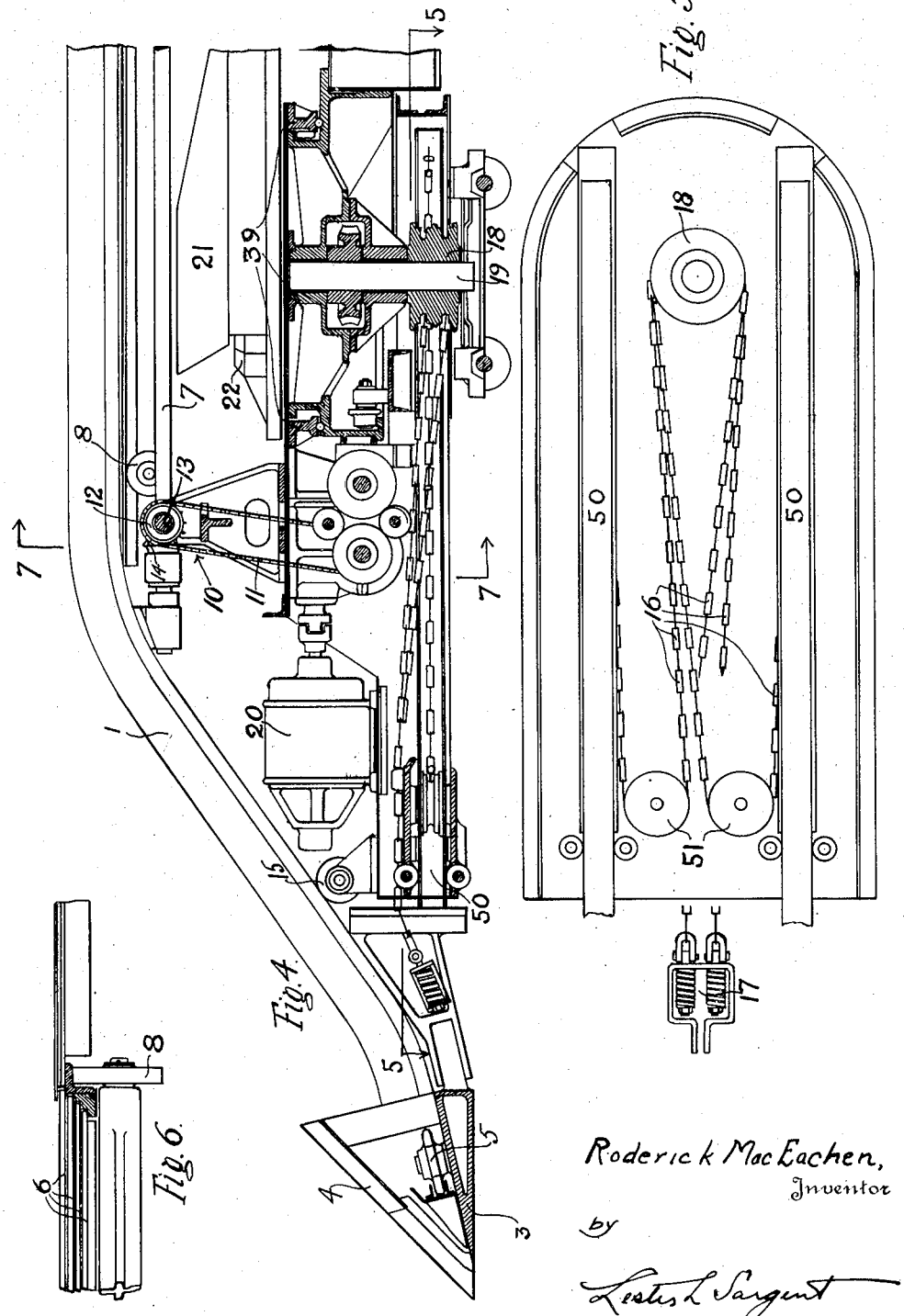

Dec. 1, 1925.　　　　　　　　　　　　　　1,563,387
R. MacEACHEN
COAL ELEVATING AND CONVEYING APPARATUS
Filed Aug. 7, 1923　　　　6 Sheets-Sheet 3

Roderick MacEachen,
Inventor

By Lester L. Sargent
Attorney

Dec. 1, 1925.
R. MacEACHEN
1,563,387
COAL ELEVATING AND CONVEYING APPARATUS
Filed Aug. 7, 1923 6 Sheets-Sheet 4
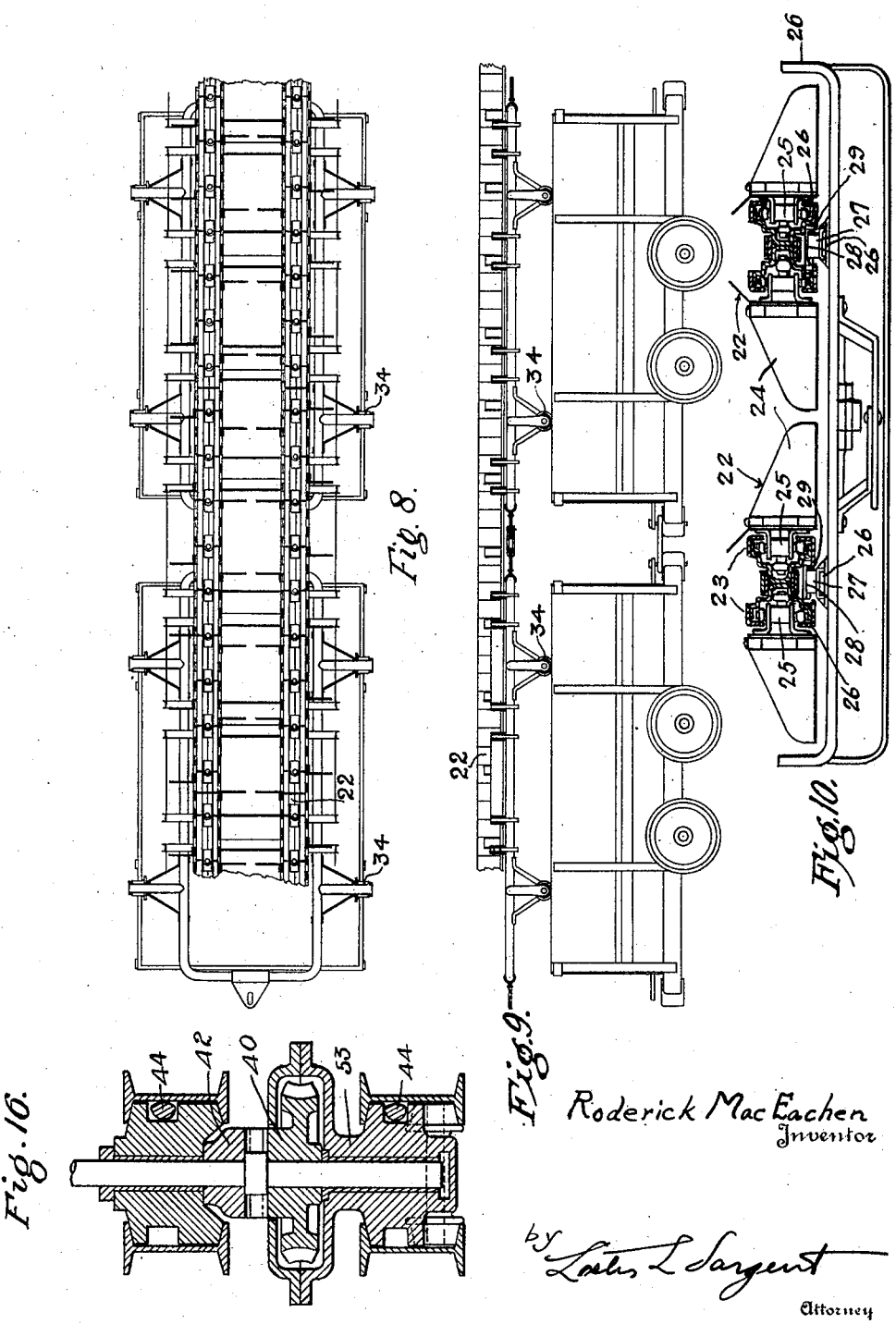
Roderick MacEachen
Inventor
by
Attorney Dec. 1, 1925.
R. MacEACHEN
1,563,387
COAL ELEVATING AND CONVEYING APPARATUS
Filed Aug. 7, 1923    6 Sheets-Sheet 5
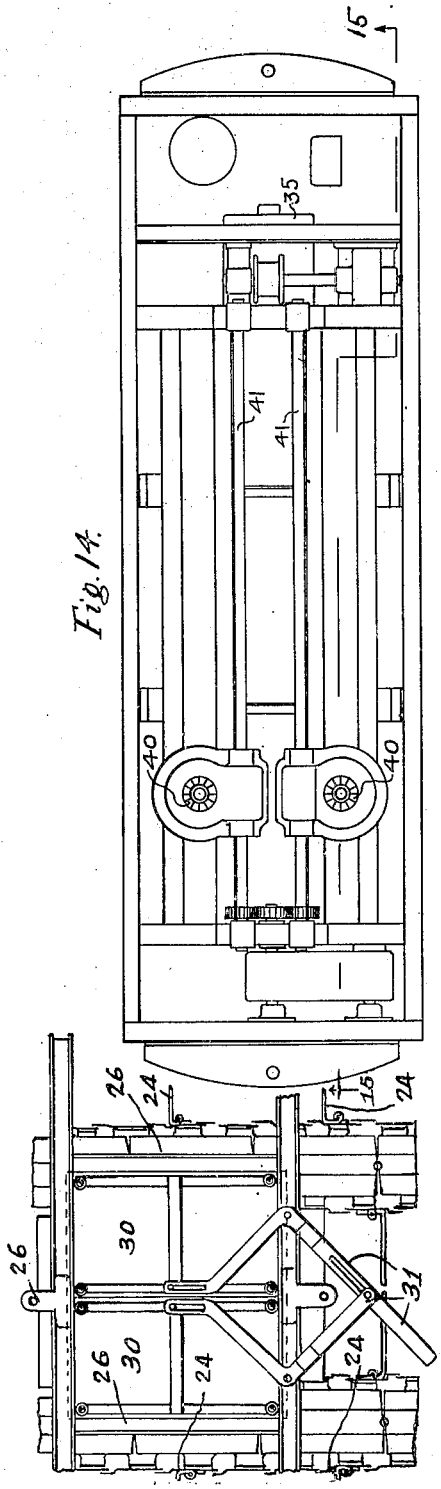
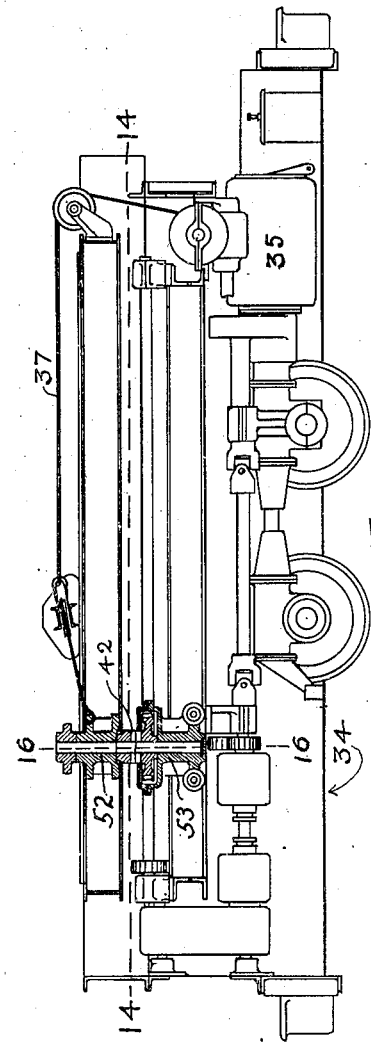
Roderick MacEachen,
Inventor
By Lester L. Sargent
Attorney

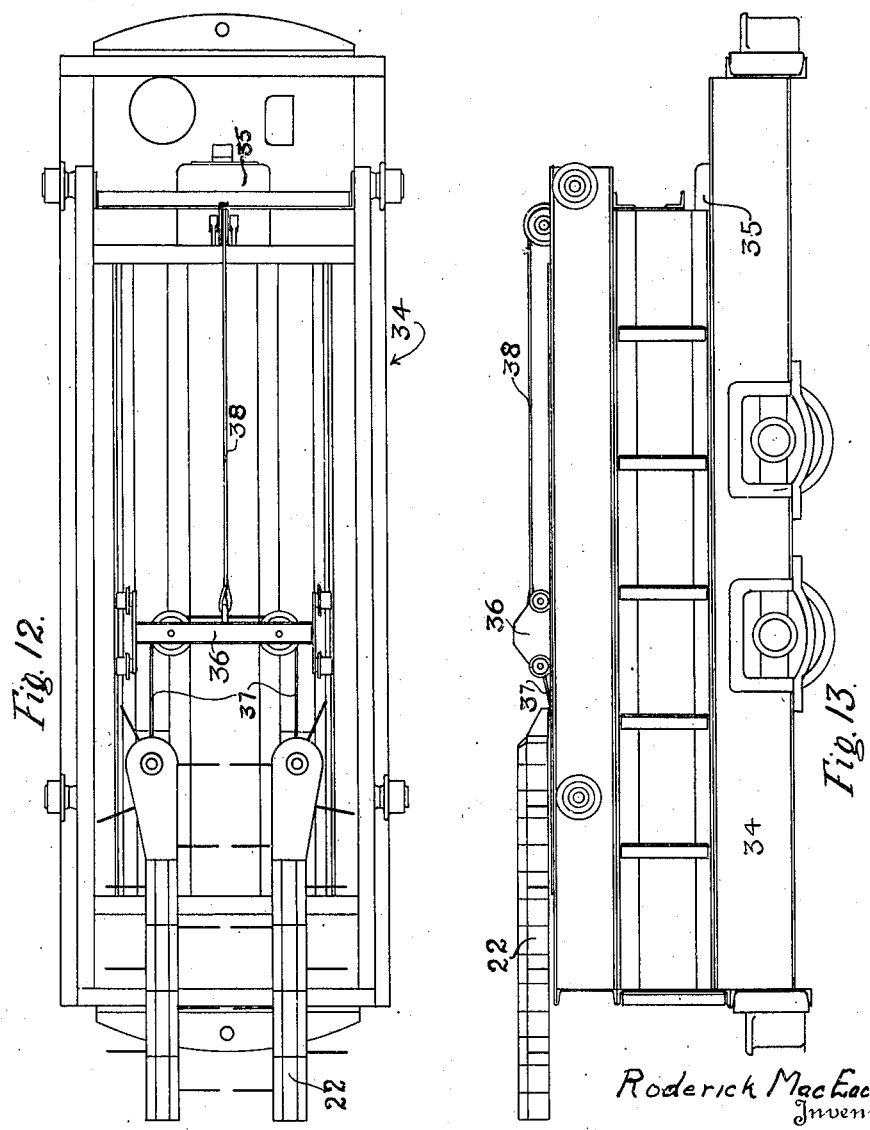

Patented Dec. 1, 1925.

1,563,387

UNITED STATES PATENT OFFICE.

RODERICK MacEACHEN, OF WASHINGTON, DISTRICT OF COLUMBIA.

COAL ELEVATING AND CONVEYING APPARATUS.

Application filed August 7, 1923. Serial No. 656,188.

*To all whom it may concern:*

Be it known that I, RODERICK MAC-EACHEN, a citizen of the United States, residing at Washington, in the District of Columbia, have invented a new and useful Coal Elevating and Conveying Apparatus, of which the following is a specification.

The object of my invention is to provide an improved apparatus for elevating and conveying coal and other loose material, and particularly to provide novel means for elevating and conveying coal in a laterally swinging elevator; to provide a novel laterally flexible conveying apparatus capable of sinuous movement to conform with winding mine passages where the machine is operated; and to provide novel means for dumping the coal at a given point or at varying portions of the elevator into the conveyor beneath. It is also the object of my invention to provide novel means for advancing the coal elevating mechanism as the work progresses and to extend its range of operations both forwardly and laterally.

It is also an object of my invention to provide novel means for shifting a conveyor rollably supported from a train of cars to an overhead track, and to provide a novel form of overhead track for this purpose.

It is also an object of my invention to provide novel means for dumping coal or other materials from an overhead conveyor continuously into a train of cars, filling first one car and then the next succeeding car, without requiring any shifting of the position of the train itself; to provide novel dumping doors in connection with the conveyor apparatus and elevator apparatus, with novel means for operating same; and to provide other improved details of construction. I attain these and other objects of my invention by the mechanism illustrated in the accompanying drawings, in which—

Figure 1 shows a side elevation of the overhead track which I have invented for receiving my conveying apparatus;

Fig. 2 is a top plan of the conveyor and elevator;

Fig. 3 is a side elevation of the same;

Fig. 4 is an enlarged vertical section, partly in elevation, of my elevator;

Fig. 5 is a horizontal section approximately on line 5—5 of Fig. 4;

Fig. 6 is a detail view of members 6 and 8;

Fig. 8 is a top plan of the conveying apparatus;

Fig. 9 is a side elevation of same;

Fig. 10 is an enlarged vertical section showing in detail the improved construction of the conveyor;

Fig. 11 is a bottom plan view of the dumping doors for both the conveyor and the elevator and the means for operating them;

Fig. 12 is a top plan view of the conveyor stretching device;

Fig. 13 is a side elevation of same;

Fig. 14 is a horizontal section approximately on the line 14—14 of Fig. 15;

Fig. 15 is a vertical section approximately on the line 15—15 of Fig. 14;

Fig. 16 is a section, enlarged, on line 16—16 of Fig. 15.

Like characters of reference indicate like parts in each of the several views.

Figure 7:
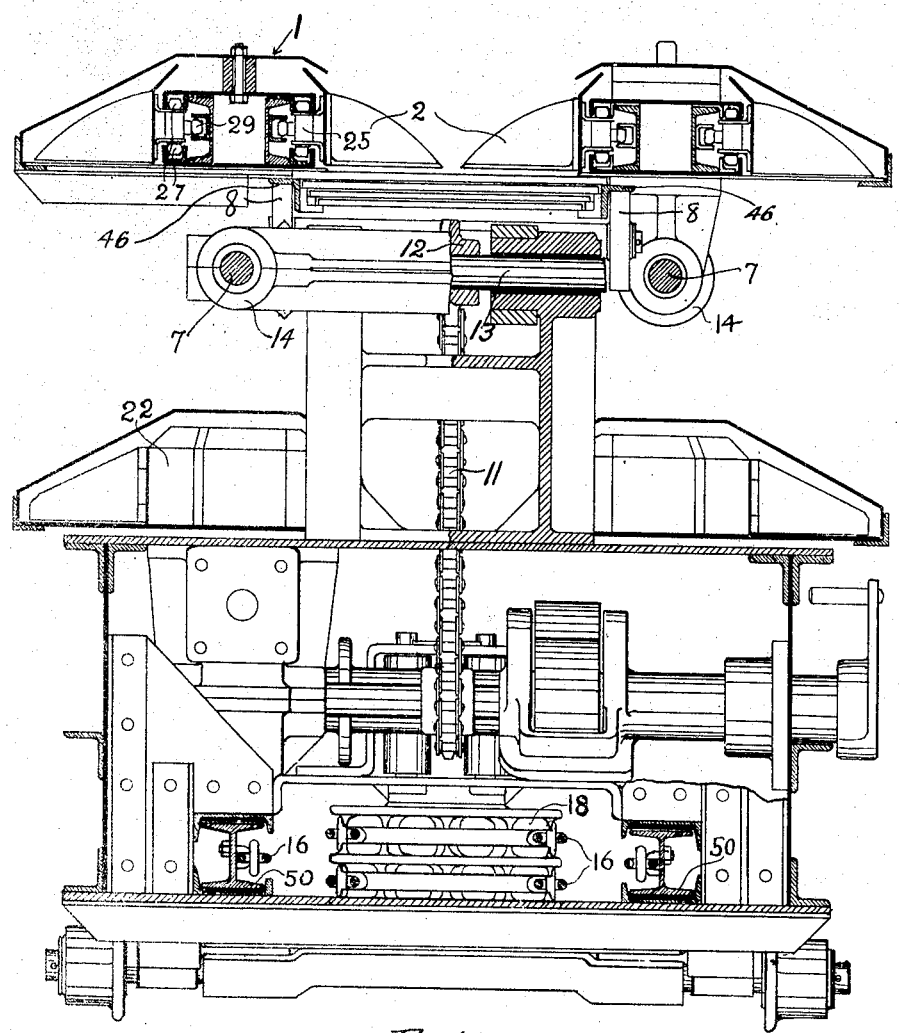
Fig. 7 is an enlarged vertical section, partly in elevation approximately on the line 7—7 of Fig. 4.

Referring to the accompanying drawings and particularly to Figs. 3 and 4, I provide an elevator 1 consisting of endless chains having oppositely positioned spaced paddles 2, the chains being mounted on suitable pairs of sprockets 5 at each end of the elevating apparatus, one of these pairs of sprockets being idlers, and the other driving sprockets. I provide a suitable shovel member 3 attached to the lower end of the elevator 6 this shovel member being provided with outwardly flared flanges 4 to protect the conveyor blades. The flanges 4 which slant towards the center of the conveyor allow the coal to slide into the conveyor. The elevator is also provided with a series of bottom telescopically sliding plates as shown in Fig. 6, these plates being arranged at the end of the elevator which extends over and discharges into the conveyor.

Elevator 1 is mounted on angle plates 46 which are slidably mounted on rollers 8, and a sliding arrangement in the power drive is provided which includes shafts 7 affixed to the elevator and moving with it and on which the power gears 14 which drive the elevator chains are slidably mounted. The sliding gears 14 mesh with sprocket wheels 12 which in turn are driven by chains 10 operatively connected with the motor 20 and a worm wheel drive. The sprockets 12 are mounted on a transverse shaft 13 (Fig. 4).

For shifting the elevator forward or rearward, I provide ram operating means, as shown in Fig. 5 said means including chains 16. Each chain has one end attached to the rear end of ram bar 50, the chain going around the idler sprocket 51 at the front end of the elevator supporting frame and returning to the rear end where chain sprocket 18 furnishes the power for the movement of the rams. The other end of the chain is fastened to a suitable spring connection 17 which acts as a buffer when movement of the rams is reversed. The ram bars 50 press the shovel member 3 forward, while chains 16 withdraw it.

I provide stationary roller 15 positioned under the elevator 6 for automatically lifting the elevator when the elevator and shovel are moved rearwards.

Coal is discharged from the rearward end of the elevator into a suitable bin 21 arranged at the forward end of the endless conveyor 22. The elevator is not laterally flexible, but has an arcuate movement of 180°, being pivoted on main shaft 19 for swinging movement horizontally.

Referring particularly to Fig. 10, I provide suitable housings 23 for the endless conveyors 22, which conveyors are provided with oppositely positioned spaced conveyor paddles 24. The housings 23 are made in hinged sections which afford the conveyor lateral flexibility. The paddles 24 are carried by endless chains 25 which travel in housings 23. Chains 25 are of novel construction having their links hinged to give both perpendicular and lateral flexibility.

As shown in Fig. 11, I provide suitable frames 26 to hold the conveyor housings in place. I also provide the conveyor housings with suitable guides for roller bearings 27 and 29 mounted in a suitable roller box 28. Roller bearings 27 control lateral movement of the conveyor and horizontal rollers 29 on which the conveyors advance or recede, as curvature of the train demands, takes care of vertical movement and eliminate sliding friction in the conveyor chains.

The frames 26 are provided with horizontally slidable doors 30 mounted on suitable rollers or ball bearings and manually operated by a lazy-tongs type of lever 31, as shown in Fig. 11.

The endless conveyors 22 are mounted on or attached to the cars in any suitable manner, this mounting or attachment being either on the top or sides of the cars as preferred the conveyors being freely movable on the cars to permit of their being switched onto a transferring track or siding 32, as shown in Fig. 1, which track is provided with tapered free ends 33, positioned to pick up or receive the rollers 34 or other corresponding members which movably support the endless conveyor carried by the train of cars. To permit of the automatic transfer of the conveyor 22 to the overhead transferring track 32, the roadbed on which the train travels is provided with a downward incline 35 at a point in proximity to the end 33 of the overhead track 32 as shown in Fig. 1.

For the purpose of taking slack in the endless conveyor I provide a stretching device which includes an overhead truck 36 suitably attached to the motor operated hoist 35 as shown in Figs. 12 and 15. Cable 37 is operatively connected with both strands or chains of the endless conveyor in such a way that slack is taken up on one chain and let out on the other when the mine cars travel through or operate in a curved or winding passage in the mine. The truck 36 is operatively connected by cable 37 with the rear end of conveyor 22, as shown in Fig. 12, to permit of the operation above described.

In operation the elevator is shifted forward to the extent required as the work progresses in scooping the coal into the elevator and thence to the conveyor. The elevator being pivotally mounted may be swung laterally over a range of half a circle. The forward operation of the elevator is effected by ram bars 50 and its rearward operation is obtained by means of chains 16 and members 17 and 18.

Coal is discharged into the bin 21 and carried along by the endless conveyors 22 over a train of cars, thus permitting of continuously elevating the coal to the horizontal conveyor and continuously delivering the coal by the horizontal conveyors to one car after another along the entire train of cars by simply operating the bottom horizontal doors of the conveyor, thereby dumping the coal into successive cars without requiring any shifting of the train of cars into any particular position to permit of their being loaded with coal, or other material.

It will be observed that an important advantage is obtained by this operation inasmuch as it is continuous and permits of the loading of an entire train of cars rapidly. As the conveyor has lateral flexibility my apparatus is capable of operating in curved or winding mine passages. When a train of cars has been filled with coal it can be drawn out and the conveyor transferred automatically to the over track 32 in the manner illustrated in Fig. 1, and then picked up again from said overhead track when a train of empty cars is brought along on a return trip.

In order that the conveyor 22 may function properly, I provide the stretching apparatus shown in Figs. 13 and 14. This is necessary because the train of cars on which the conveyor is operatively mounted or attached may, as the cars are not closely coupled, stop in a position requiring such adjustment of the conveyor. The method of taking up slack in the conveyor involves the operation of the cable attachment (members 36, 37 and 38) by means of the motor hoist 35 on the rear power car. The equipment of the rear power car includes sliding gears 40, slidably mounted on shafts 41 extending longitudinally of the car, as shown in the drawings, and operating in a manner similar to that of the slidable gears 14 of the front or elevator power car. The gears 40 drive the conveyor chains. The rear power car is also provided with jaw clutches 42 which engage the conveyor chain driving shaft 41. The stretching apparatus functions to hold the flexible conveyor rigidly in any position in which the ends happen to be while it is in operation as a conveyor. The sliding gears are made immobile or held against sliding movement by means of a clamping device 43 which includes a rod 44 which is oval in cross section and which extends the full length of the sliding bearing trough, as shown in detail in Fig. 16. Rod 44 holds the bearing 45 stationary while the conveyor 22 is in operation.

What I claim is:

1. In a device of the class described, a coal elevator, supporting means on which said elevator is slidably mounted, chains attached to said elevator, sprockets over which said chains travel, and power-controlled means for driving the sprockets to slide the elevator rearwardly.

2. In an apparatus of the class described, the combination with a train of mine cars, of a laterally flexible endless conveyor, and means for rollably supporting said conveyor for longitudinal movement on the mine cars.

3. In an apparatus of the class described, the combination with a train of cars, of a laterally flexible endless conveyor, supported from the train of cars, an over head track having its end rails tapered and positioned approximately in alignment with the top of the train of cars, whereby the overhead track will automatically function as a transferring track for the endless conveyor when a train of cars is run under it.

4. In an apparatus of the class described, the combination with a train of cars, of a laterally flexible endless conveyor, rollably supported on the train of cars, an overhead track having its end rails positioned approximately in alignment with the top of the train of cars, whereby the overhead track will function automatically as a transferring track for the endless conveyor when a train of cars is run under said track.

5. In flexible conveyor, the combination of an endless chain, said chain having its links pivotally and hingedly connected to permit of both perpendicular and lateral flexibility, with housings in which said endless chain travels, said housings being made in sections, the sections being hinged to each other to permit of lateral flexibility, paddles carried by links of the chains, the paddles being oppositely positioned and roller bearings carried by the links of the chain to afford freely flexible lateral movements of the conveyor, substantially as described.

6. In an apparatus of the class described, a coal elevator capable of arcuate movement power controlled means for forwardly operating said elevator, power controlled means for rearwardly operating said elevator, and a stationary roller positioned on the base of the machine and under and in contact with the inclined floor of the elevator, for the purpose of lifting said elevator in its rearward movement and thus to swing it free from the ground, and permit of an arcuate swinging movement.

7. In an apparatus of the class described, the combination of an elevator, said elevator having a portion thereof horizontally disposed, means for forwardly and rearwardly operating said elevator, an endless conveyor having its forward end extending a substantial distance under the horizontal portion of the aforesaid elevator, the elevator being provided with sliding bottom plates to enable it to discharge into said conveyor whether the elevator be in its rearward or in its forward position relative to the conveyor.

8. In an apparatus of the class described, the combination of an elevator, shafts affixed to the upper end of the elevator and movable therewith, means operating said shafts for moving the elevator forwardly and rearwardly, gears driving the elevating mechanism, said gears being slidably mounted on the aforesaid shafts to permit of free forward and rearward movement of the elevator without interruption to the operation of the elevating mechanism.

9. In an apparatus of the class described, a flexible conveyor supported on and from a train of cars, said conveyor including spaced conveying chains and paddles carried by said chains, means for giving lateral flexibility to the aforesaid mechanism, gears operating said conveyor chains, shafts supported in stationary position on which said gears are slidably mounted, whereby the conveyor may be operated in any position in which the gears at the ends of the conveyor happen to be whether the train of cars is on a curved or straight track.

10. In combination with the apparatus described in claim 9, sliding bearings for the aforesaid sliding gear mechanism, and means for clamping and locking the mechanism in any given position.

11. In combination with the apparatus described in claim 9, a power operated stretching device operatively connected with the mechanism operating the conveyor chains.

12. In an apparatus of the class described, the combination of a flexible conveyor composed of separate elements, namely, flexible housing carrying endless chain and having sectional and flexible bottoms to which said housing is slidably attached, supported from a train of cars, means for operating the conveyor in any given position in which it may come to rest whether the cars are on a curved or straight track, and a power operated stretching device operatively connected with the conveyor at one end thereof for stretching the chain and housing elements of the conveyor into an operative position whenever required.

RODERICK MacEACHEN.